Adolph Millochau
Impts. in the manufacture of Lamp Black

No. 72,068

PATENTED
DEC 10 1867

Chas H Smith
Geo L Walker

Adolph Millochau
per L. W. Serrell
Atty

United States Patent Office.

A. MILLOCHAU, OF NEW YORK, N. Y., ASSIGNOR TO R. N. PERLEE, OF JERSEY CITY, NEW JERSEY.

Letters Patent No. 72,068, dated December 10, 1867.

---

IMPROVEMENT IN THE MANUFACTURE OF LAMP-BLACK.

---

The Schedule referred to in these Letters Patent and making part of the same.

---

TO ALL WHOM IT MAY CONCERN:

Be it known that I, ADOLPH MILLOCHAU, of the city and State of New York, have invented and made a certain new and useful Improvement in the Manufacture of Lamp-Black; and I do hereby declare the following to be a full, clear, and exact description of the said invention, reference being had to the annexed drawing, making part of this specification, wherein—

Similar marks of reference denote the same parts.

Heretofore it has been usual to allow the smoke from the combustion of carbonaceous substances to enter a chamber or room, and there condense; but the quality of lamp-black produced in this manner is inferior, and has none of the brilliancy of that produced by my improvement, which consists in bringing the flame into contact with a surface that is constantly kept sufficiently cool to condense the lamp-black upon the same.

Heretofore small quantities of lamp-black have been produced upon a cold surface, such as a piece of sheet metal or glass, but there was no provision for continuing the operation, and as soon as the surface became heated the lamp-black was injured in its color.

Figure 2:
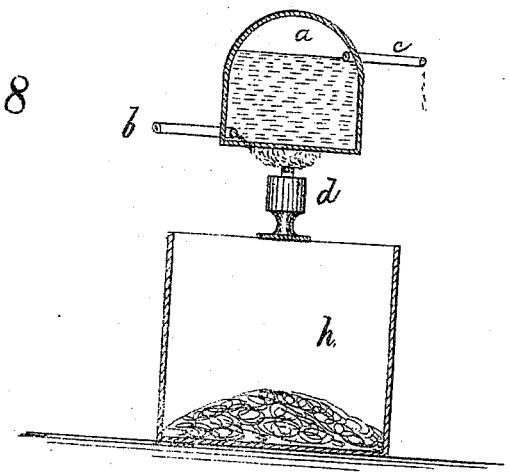
Figure 2 is a cross-section, illustrating a modification of said invention.
Figure 1:
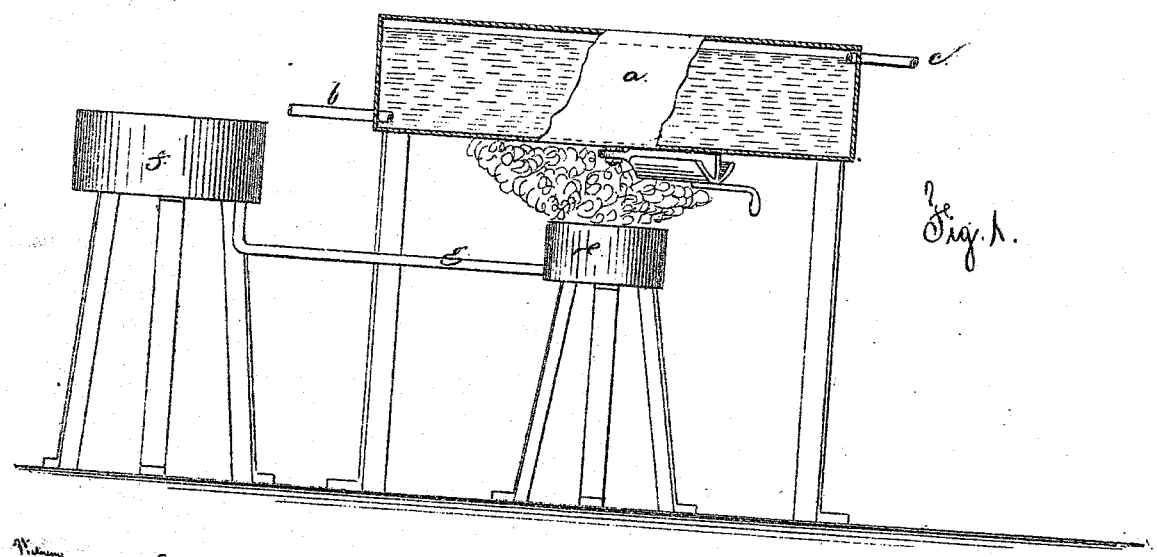
Figure 1 is an elevation of my said invention.

The nature of my said invention will be more fully understood by reference to the annexed drawing. In this, $a$ represents a pan or boiler, to which water is supplied gradually by a pipe, $b$, and allowed to pass off from the overflow $c$; or, if a closed vessel is used, air may be forced through the vessel. In either case the object is to keep the said vessel sufficiently cool for a uniform and superior quality of lamp-black to be condensed on its under surface. The flame may be produced from any desired character of lamp or vessel. In fig. 2, I have shown a lamp, $d$, and in fig. 1 a vessel, $e$, supplied gradually with oil, or other carbonaceous material, from the vessel $f$, through the pipe $g$, the same burning upon the surface, and its smoke being condensed upon the vessel. The lamp-black may be scraped off into a receptacle below the flame, as at $h$; or a trough-shaped scraper may be employed, to be drawn across the surface frequently, to remove the lamp-black into the trough; or said scraper may be attached, at one end, in the centre of a round vessel, and be revolved below it from time to time to scrape the black into the trough, whence it may be removed by a hoe or other suitable device.

What I claim, and desire to secure by Letters Patent, is—

The method herein specified of manufacturing lamp-black by condensing the carbonaceous vapors upon a surface, directly over the flame, that is constantly kept sufficiently cool by artificial means.

In witness whereof, I have hereunto set my signature, this 12th day of October, A. D. 1867.

A. MILLOCHAU.

Witnesses:
    CHAS. H. SMITH,
    GEO. D. WALKER.